United States Patent
Gonzalez-Gutierrerz

(10) Patent No.: US 10,711,614 B2
(45) Date of Patent: Jul. 14, 2020

(54) GAS TURBINE ENGINE

(71) Applicant: ROLLS-ROYCE plc, London (GB)

(72) Inventor: Gabriel Gonzalez-Gutierrerz, Derby (GB)

(73) Assignee: Rolls-Royce PLC, London (GB)

(*) Notice: Subject to any disclaimer, the term of this patent is extended or adjusted under 35 U.S.C. 154(b) by 119 days.

(21) Appl. No.: 15/933,417

(22) Filed: Mar. 23, 2018

(65) Prior Publication Data
US 2018/0283179 A1    Oct. 4, 2018

(30) Foreign Application Priority Data
Mar. 24, 2017    (GB) .................................. 1704657.4

(51) Int. Cl.
| | | |
|---|---|---|
| *F01D 5/14* | (2006.01) | |
| *F01D 5/34* | (2006.01) | |
| *B64D 29/06* | (2006.01) | |
| *F04D 29/32* | (2006.01) | |
| *B64D 27/10* | (2006.01) | |

(52) U.S. Cl.
CPC ............. *F01D 5/141* (2013.01); *B64D 27/10* (2013.01); *B64D 29/06* (2013.01); *F01D 5/34* (2013.01); *F04D 29/324* (2013.01); *F05D 2220/323* (2013.01); *F05D 2220/36* (2013.01); *F05D 2240/303* (2013.01); *F05D 2240/304* (2013.01); *F05D 2250/70* (2013.01); *Y02T 50/673* (2013.01)

(58) Field of Classification Search
CPC . F01D 5/148; F01D 5/16; F01D 5/141; F01D 5/14; F01D 5/34; F04D 29/386; F04D 29/32
See application file for complete search history.

(56) References Cited

U.S. PATENT DOCUMENTS

| | | | | |
|---|---|---|---|---|
| 5,167,489 | A * | 12/1992 | Wadia ..................... | B64C 11/18 415/182.1 |
| 7,384,240 | B2 * | 6/2008 | McMillan ............... | F01D 5/147 416/131 |
| 7,476,086 | B2 * | 1/2009 | Wadia ..................... | F01D 5/141 416/223 R |
| 7,497,664 | B2 * | 3/2009 | Walter .................... | F01D 5/141 416/223 A |
| 2014/0169972 | A1 | 6/2014 | Suciu et al. | |

FOREIGN PATENT DOCUMENTS

| | | |
|---|---|---|
| EP | 2730501 | 5/2014 |
| EP | 3144216 | 3/2017 |

OTHER PUBLICATIONS

Great Britain Search Report dated Jun. 19, 2017 issued in GB Patent Application No. 1704657.4.

* cited by examiner

*Primary Examiner* — Woody A Lee, Jr.
*Assistant Examiner* — Andrew Thanh Bui
(74) *Attorney, Agent, or Firm* — Simpson & Simpson, PLLC

(57) ABSTRACT

A boundary layer ingestion engine comprising a fan, the fan comprising a disc and a plurality of blades integrally formed with the disc.

7 Claims, 3 Drawing Sheets

GAS TURBINE ENGINE

CROSS-REFERENCE TO RELATED APPLICATIONS

This specification is based upon and claims the benefit of priority from UK Patent Application Number 1704657.4 filed on 24 Mar. 2017, the entire contents of which are incorporated herein by reference.

BACKGROUND

1. Field of the Disclosure

The present disclosure concerns a gas turbine engine and/or an aircraft.

2. Description of the Related Art

Conventionally engines are mounted to the fuselage or wings of a gas turbine engine using a pylon to space the engine from a boundary layer that forms around the aircraft. More recently it has been proposed that the engines be mounted directly adjacent the fuselage or wings. This can improve energy efficiency and reduce the environmental impact of aircraft. However, in these arrangements the engine is not provided away from a boundary layer that forms around the fuselage and wings so the engine is subjected to distortion associated with boundary layer ingestion. Engines mounted directly adjacent the fuselage or wings are known in the art as boundary layer ingestion (BLI) engines. There are different design considerations for a BLI engine compared to a conventional engine due to the impact of the boundary layer on engine operation.

SUMMARY

According to a first aspect there is provided a boundary layer ingestion engine comprising a fan. The fan comprises a disc and a plurality of blades integrally formed with the disc.

A passageway may be defined between adjacent blades, and the blades may be arranged relative to each other and/or may be cambered such that the width of the passageway between the adjacent blades converges and then diverges from an entrance to an exit of the passageway, with the width being measured perpendicularly to a camber line of the blades.

Each blade may comprise a mid-section and a trailing edge section adjacent the mid-section and curving from the mid-section. The camber of a trailing edge of the blade is angled at least 10 degrees from the chord of the mid-section of the blade.

Each blade may comprise a mid-section and a leading edge section adjacent the mid-section and curving from the mid-section. The camber of a leading edge of the blade may be angled equal to or between 1 and 10 degrees from the chord of the mid-section of the blade.

The chord of the mid-section is the chord line that would exist if there were no local cambering of the trailing edge and/or leading edge. For example, the chord between two ends of the camber line of the mid-section.

Each blade may comprise a mid-section, a trailing edge section adjacent the mid-section, and a leading edge section adjacent the mid-section. The trailing edge section and the leading edge section may be locally cambered and curve from the mid-section in opposite directions.

For example, a camber line that extends from a leading edge to the trailing edge (i.e. through the leading edge section, mid-section and trailing edge section) of the blade may be considered to define an S-shape. The blade may be considered as having a double camber.

The leading edge section may be considered to curve towards an adjacent blade in a direction of rotation of the fan. The leading edge section may be considered to curve away from an adjacent blade in a direction of rotation of the fan.

Each blade may have a height to chord ratio equal or between 2.0 and 2.5.

At a position adjacent the disc each blade may have a thickness to chord ratio equal to or between 0.12 and 0.25.

Each blade may have a thickness to chord ratio at the tip equal to or between 0.02 and 0.04.

In an aspect there is provided a gas turbine engine for operation in subsonic conditions comprising a fan having a disc and a plurality of blades arranged around the disc, wherein a leading edge section of each blade is locally cambered in a first direction and a trailing edge section of each blade is locally cambered in a second direction, and wherein the first direction and second direction are such that a camber line of the blade bisects a chordal line of the blade.

In an aspect there is provided an aircraft comprising a fuselage, wings and a gas turbine engine according to the previous aspect, wherein the gas turbine engine is mounted adjacent to the fuselage or wings by a distance such that a boundary layer flow over the fuselage is ingested in the engine.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
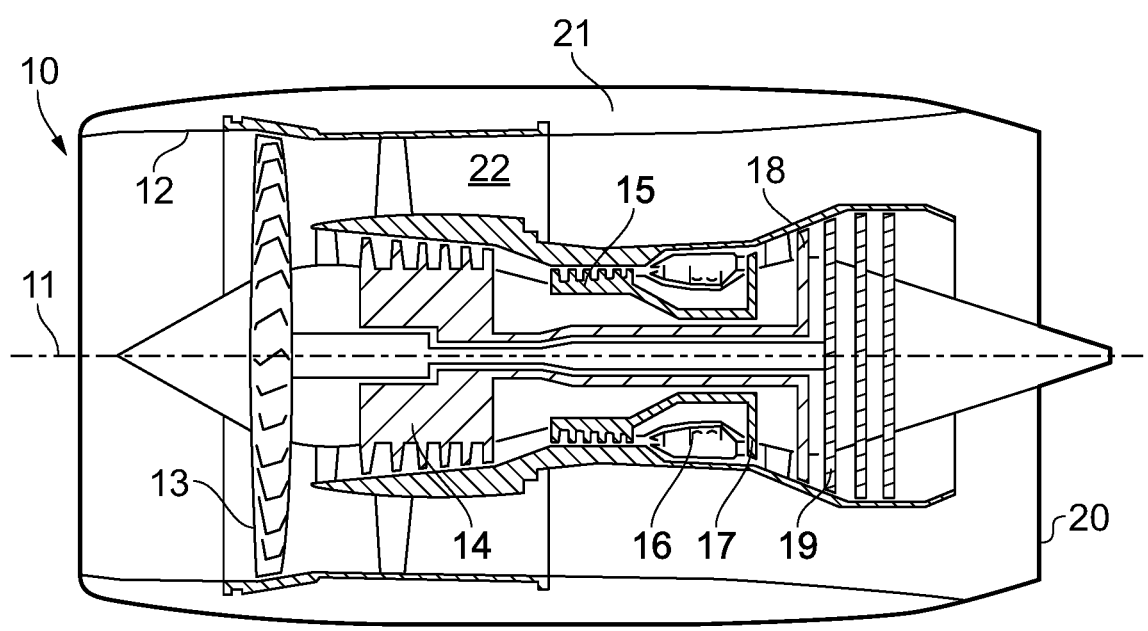
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
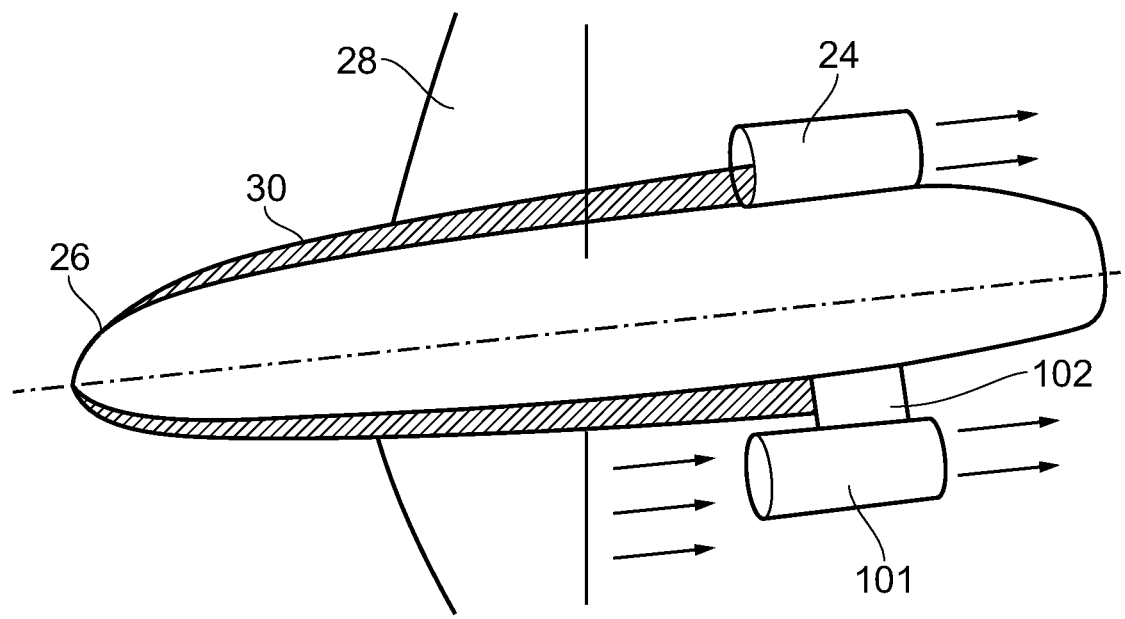
FIG. 2 is a schematic comparison of a boundary layer ingestion (BLI) engine (shown in the top half) and a conventional engine (shown in the bottom half)

Referring to FIG. 2, the present disclosure is concerned with a boundary layer ingestion (BLI) engine 24. In this example, the BLI engine is mounted directly to the fuselage 26 and rearward of the wings 28. A BLI engine is understood in the art to be an engine that is mounted in close proximity to the fuselage or wings, such that the engine ingests flow from the boundary layer 30 around the aircraft. This is contrary to a more conventional arrangement (shown in the lower half of FIG. 2) where the engine 101 is mounted away from the boundary layer using a pylon 102. The BLI engine of the present disclosure is intended for operation at subsonic conditions.

Figure 3:
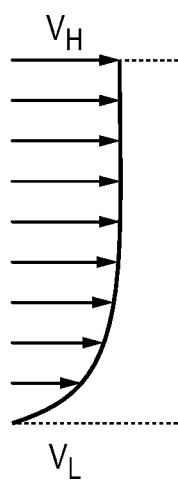
FIG. 3 is an illustration of the velocity of air entering an inlet of the BLI engine of FIG. 2.
Figure 4:
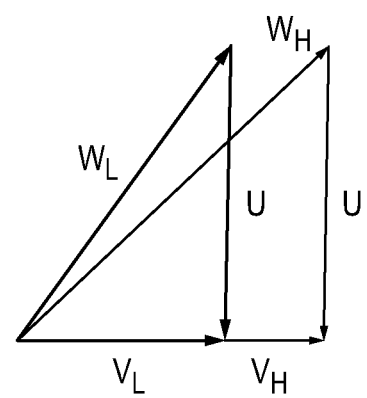
FIG. 4 is an illustration of the direction of air entering the inlet of the BLI engine of FIG. 2.

As illustrated in FIGS. 3 and 4, ingestion of the boundary layer 30 means that there is a variation in the magnitude and direction of the velocity of the air entering the inlet of the BLI engine 24. In FIGS. 3 and 4, V refers to flow velocity in the engine frame of reference, U refers to the blade peripheral speed, and W refers to flow velocity in the blade frame of reference.

Figure 5A:
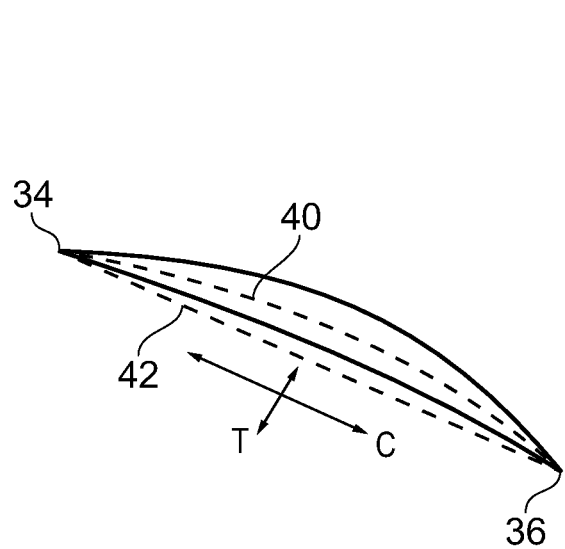
FIG. 5A is an illustrative cross section of a fan blade.
Figure 5B:
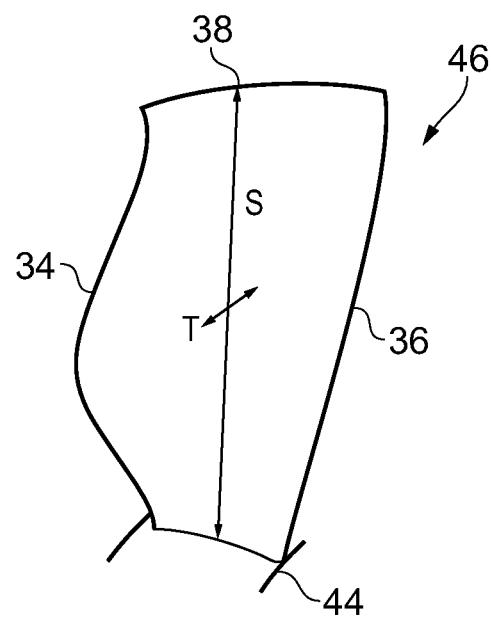
FIG. 5B is an illustrative side view of a fan blade.

Referring to FIGS. 5A and 5B, in the present application, conventional aero-definitions are used. A fan blade 46 includes a leading edge 34 and a trailing edge 36. A camber line 40 is a curved line that extends from the leading edge to the trailing edge and is provided mid-way between the gas washed surfaces (i.e. the pressure surface and the suction surface) of the blade. A chord line 42 is a linear line that extends directly from the leading edge to the trailing edge of the blade. A chordal direction C extends directly from the leading edge 34 to the trailing edge 36, and is in a direction parallel to the chordal line. A spanwise direction S extends from a position proximal a hub of the fan to a tip 38 of the fan blade. A thickness direction T is a direction perpendicular to the chordal direction and the spanwise direction.

The BLI engine of the present disclosure includes a fan (indicated at 13 in FIG. 6) that includes a disc 44 and a plurality of blades 46 integrally formed with the disc. For example, the blades 46 and disc 44 may be machined from solid, or the blades 46 may be welded to the disc 44. The blades may be blended to the disc using a circular or elliptical fillet.

The inventor of the present application has unexpectedly found that using a disc with integral blades (commonly referred to as a blisk) on a BLI engine can improve engine performance. This goes against the teaching in the art because the person skilled in the art would not consider using a fan having a disc with integrally formed blades because these engines can experience high vibrations during operation, and a disc with integrally formed blades does not offer any mechanical damping. However, the inventor has unexpectedly found that the blades of the fan can be arranged to reduce vibration to an acceptable level to permit a disc with integral blades to be used.

The advantages of using a fan having a disc 44 with integrally formed blades 46 include that the structure can be stronger so distortion of the fan can be reduced. Further, there are no surface contacts (compared to the disc-blade interactions on non-integral bladed discs) that can be subject to high stress and wear.

The blades 46 of the fan can be arranged to reduce aerodynamic loading and to reduce vibration. The arrangement of the blades will now be described in more detail.

Figure 6:
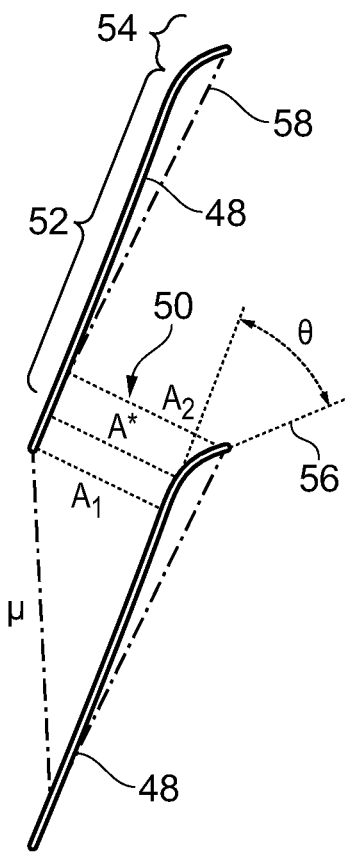
FIG. 6 is an example of camber lines of two adjacent blades of a fan of a BLI engine.

Referring to FIG. 6, the camber line 48 of two adjacent blades is illustrated. A passageway 50 is provided between the blades. The passageway may be considered a covered passageway, in that the passageway extends along the region of overlap between the blades. The width of the passageway converges and then diverges. This means that the distance between the camber lines 48 of the two adjacent blades decreases and then increases along the passageway in a direction of airflow. The distance between the camber lines is measured in a direction perpendicular to the camber lines. The width $A_1$ at the entrance to the passageway is larger than the width $A^*$ mid-way along the passageway, and the width $A_2$ at the exit of the passageway is larger than the width $A^*$. In the present example, the width $A^*$ is at the transition point between a mid-section 52 of the blade and a trailing edge section 54 of the blade. The convergent-divergent nature of the passageway can prevent any shock waves in the flow exiting the passageway.

The blades include local cambering of the trailing edge section 54 of the blades, such that the camber lines of the blades curve more in the trailing edge section than in the mid-section. The trailing edge section extends from a point where the increase in curvature of the trailing edge section starts to the trailing edge. An angle θ between the chord of the mid-section (i.e. the camber line that would be present if there were no local cambering of the trailing edge section), and the camber 56 of the trailing edge section at the trailing edge is greater than or equal to 10 degrees. As can be seen, this means the camber line 48 of the blades is on one side of the chordal line 58, and is spaced a maximum distance from the chordal line at a transition between the mid-section and the trailing edge section.

Figure 7:
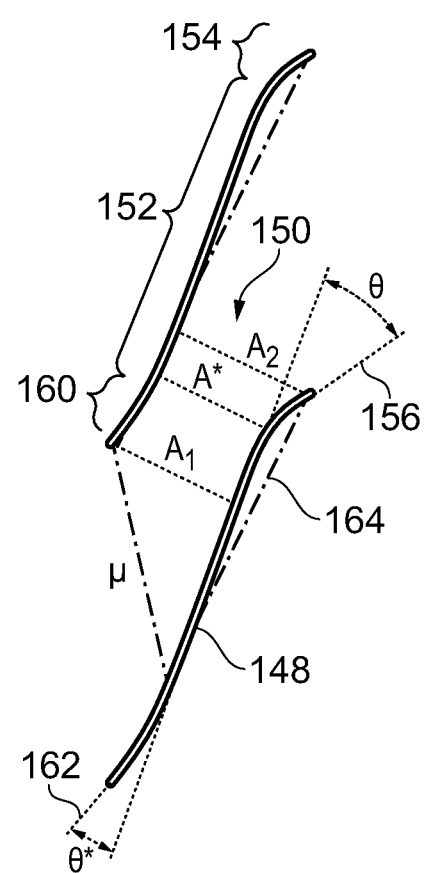
FIG. 7 is a further example of camber lines of two adjacent blades of a fan of a BLI engine.

Referring now to FIG. 7, alternative blade arrangements may include local cambering of the leading edge. The remaining features of the blade arrangement are substantially similar to the blade arrangement previously described so the features previously described will not be repeated here. In the example shown in FIG. 7, the passageway 150 between the blades is convergent-divergent as previously described. That is, the width $A_1$ of the passageway at the entrance is greater than the width $A^*$ of the passageway mid-way along the passageway at a transition between a mid-section 152 and a trailing edge section 154. Also, the width $A_2$ of the passageway at the exit is greater than the width $A^*$ mid-way along the passageway. As can be seen when comparing FIGS. 6 and 7, the difference between the widths $A_1$ and $A^*$ is greater for the blades illustrated in FIG. 7 than in FIG. 6.

The increase in difference in widths $A_1$ and $A^*$ is due to local cambering of the leading edge. As can be seen in FIG. 7, a leading edge section 160 has an increased camber compared to the camber of the mid-section. In the present example, the camber 162 at the leading edge is less than 10 degrees from the camber of the mid-section at a transition from the leading edge section to the mid-section (i.e. the camber line that would be present if there were no local cambering of the trailing edge section). The camber of the leading edge section is angled from the camber of the mid-section in an opposite direction to the camber 156 of the trailing edge section. The leading edge section, mid-section and trailing edge section together define a camber line 148 of the blade that defines a substantially S-shape. The S-shape of the camber line means that the camber line extends to one side of the chordal line 164 and then to the opposite side of the chordal line. The maximum distance between the camber line and the chordal line is at the transition points between the leading edge section and the mid-section and the trailing edge section and the mid-section.

Referring again to FIG. 6, the blades 46 of the fan may have an aspect ratio equal to or between 2.0 and 2.5. Aspect ratio is understood to be the height (measured in a spanwise direction) to chord (i.e. the length of the chordal line) ratio. The blades of the fan may have a thickness (measured in the thickness direction) to chord ratio equal to or between 0.12 and 0.25 at a position adjacent the disc of the fan, and equal to or between 0.02 and 0.04 at a tip of the fan blade.

During operation, the fan tip loading less than 0.3, where fan tip loading is calculated by $dH/U_{tip}^2$, where dH is the enthalpy rise across the fan (for example the 1-D average enthalpy rise of the flow across the fan at cruise conditions), and $U_{tip}$ is the velocity of the tip, for example at cruise conditions, which may be calculated as the rotational speed multiplied by the tip radius at the leading edge.

The aircraft boundary layer will induce a change in blade surface pressures every fan revolution. This change results in cyclic loading of the blade which will induce blade vibrations. In the present example, the vibration mode does not significantly change the distance p indicated in FIGS. 6 and 7.

The described fan arrangements have been found to reduce blade vibratory response associated with boundary layer ingestion and/or other flow velocity distortion into the fan rotor.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. An aircraft comprising a fuselage and a boundary layer ingestion engine wherein the gas turbine engine is mounted adjacent to the fuselage by a distance such that a boundary layer flow over the fuselage is ingested in the engine, the boundary layer ingestion engine comprising a fan, wherein the fan comprises a disc and a plurality of blades integrally formed with the disc;
wherein a passageway is defined between adjacent blades, and the blades are arranged relative to each other and are cambered such that the width of the passageway between the adjacent blades converges and then diverges from an entrance to an exit of the passageway, with the width being measured perpendicularly to a chordal line of the blades; and
wherein each blade comprises a mid-section and a trailing edge section adjacent the mid-section and curving from the mid-section, wherein each blade includes local cambering of the trailing edge section, such that a camber line of each blade curves more in the trailing edge section than in the mid-section, and wherein a camber of a trailing edge of the blade is angled at least 10 degrees from a chord of the mid-section of the blade.

2. The aircraft according to claim 1, wherein each blade comprises a leading edge section adjacent the mid-section and curving from the mid-section, and wherein a camber of a leading edge of the blade is angled between 1 and 10 degrees from the chord of the mid-section of the blade.

3. The aircraft according to claim 1, wherein each blade comprises a leading edge section adjacent the mid-section, and wherein the trailing edge section and the leading edge section are locally cambered and curve from the mid-section in opposite directions.

4. The aircraft according to claim 1, wherein each blade has a height to chord ratio between 2.0 and 2.5.

5. The aircraft according to claim 1, wherein at a position adjacent the disc each blade has a thickness to chord ratio between 0.12 and 0.25.

6. The aircraft according to claim 1, wherein each blade has a thickness to chord ratio at the tip between 0.02 and 0.04.

7. The aircraft according to claim 1, wherein each blade comprises a leading edge section, wherein the leading edge section of each blade is locally cambered in a first direction and the trailing edge section of each blade is locally cambered in a second direction, and wherein the first direction and second direction are such that the camber line of the blade bisects the chordal line of the blade.

* * * * *